May 7, 1963 — B. A. PEARSON — 3,088,505
OVERHEAD LATHE CHARGER
Filed Sept. 4, 1956 — 7 Sheets-Sheet 1

INVENTOR.
Bernard A. Pearson
BY
Attorneys

May 7, 1963   B. A. PEARSON   3,088,505
OVERHEAD LATHE CHARGER
Filed Sept. 4, 1956   7 Sheets-Sheet 4

INVENTOR.
Bernard A. Pearson
BY
Attorneys

May 7, 1963

B. A. PEARSON 3,088,505

OVERHEAD LATHE CHARGER

Filed Sept. 4, 1956

INVENTOR.
Bernard A. Pearson

BY
Barnes & Seek
Attorneys

United States Patent Office 3,088,505
Patented May 7, 1963

3,088,505
OVERHEAD LATHE CHARGER
Bernard A. Pearson, Seattle, Wash., assignor to Ederer Engineering Co., Seattle, Wash., a corporation of Washington
Filed Sept. 4, 1956, Ser. No. 607,785
13 Claims. (Cl. 144—209)

This invention relates to an overhead lathe charger, and namely mechanism for charging log blocks to the chucks of a lathe. While designed primarily for peeler lathes, the principles of the invention perforce also lend themselves to use in charging blocks to a barking lathe.

For its general object the invention aims to provide an overhead charger of comparatively simple and inexpensive construction which will perform its intended function of charging peeler blocks to the chucks of a peeler lathe with exceptional accuracy and with unusual speed.

More particular objects and advantages will appear in the course of the following description and claims, the invention consisting in the novel construction and in the adaptation and combination of parts hereinafter described and claimed.

In the accompanying drawings:

FIG. 16 is a diagrammatic view of the hydraulic circuit which the invention provides.

Figure 1:
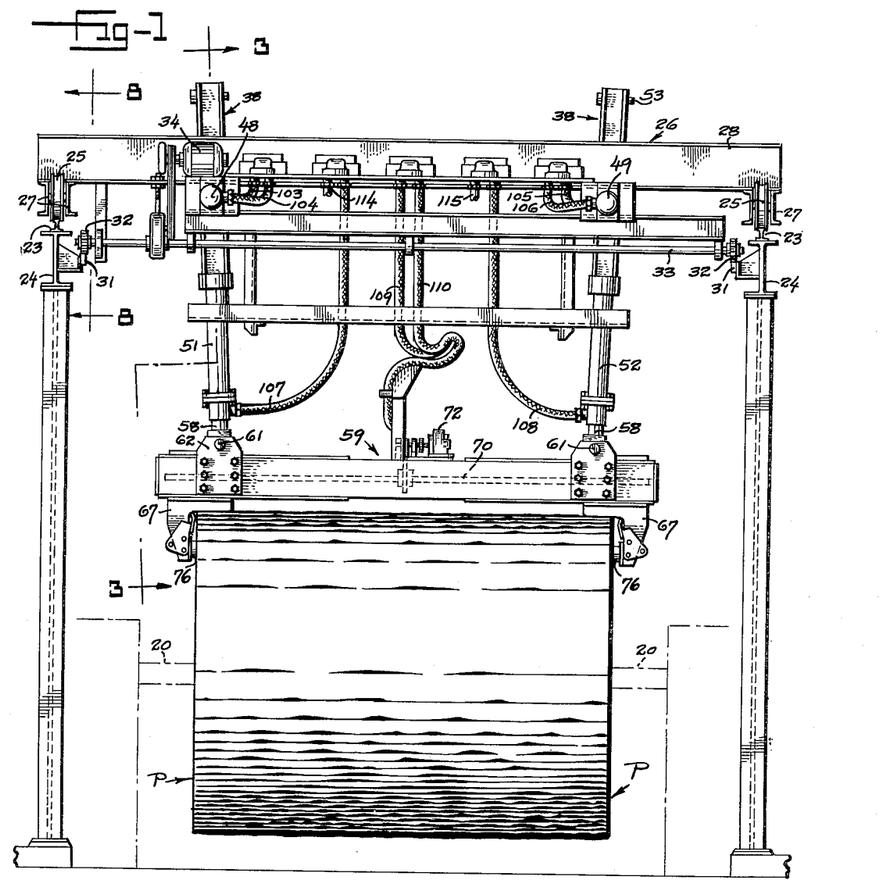
FIGURE 1 is a front elevational view of a lathe charger constructed to embody the preferred teachings of the present invention and here shown grasping a peeler block after having lifted such block from a landing stage and pre-centered the same for transfer to the chucks of a peeler lathe, said chucks being indicated by broken lines.
Figure 2:
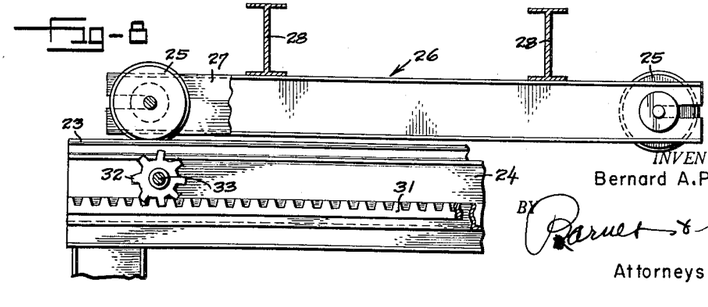
FIG. 2 is a fragmentary side elevational view thereof, deleting posts which give support to main framing beams, and showing by full and broken lines the position of the charger as it moves from said "pre-centering" position to the lathe-charging position.

In said drawings the lathe chucks with which the charger of the present invention is employed are portrayed in FIGS. 1 and 2, being shown by dotted lines and being designated by the numeral 20. The peeler blocks which are to be handled by the charger are denoted by the letter P. In bringing the blocks to a landing stage from whence the same are picked up by the charger, there is provided a conveyor here illustrated as comprising endless chains 21 trained about sprocket wheels 22, the position of the conveyed peeler blocks upon the landing stage being such as to locate the same more or less parallel with the axis of the chucks.

According to the present invention there is provided above the landing stage a suspension-type overhead twin-rail crane. The rails 23 extend in a direction at right angles to the vertical plane occupied by the center line of the lathe, deriving their support from longitudinal beams 24. Tracking upon such rails are the wheels 25 of a crane carriage 26. As here illustrated, the frame for such carriage provides at each side a pair of laterally spaced channels 27 receiving the wheels therebetween, and connecting these side channels are front and rear transverse I-beams 28. Adjacent each side and extending longitudinally below the I-beams the frame includes pairs of transversely spaced channels 30. The two beams 24 each have a rack 31 extending along the inner side thereof. Meshing with these racks are pinions 32 carried by the carriage 26 upon a cross-shaft 33, the cross-shaft being driven by a reversing electric motor 34.

Figures 3, 4:
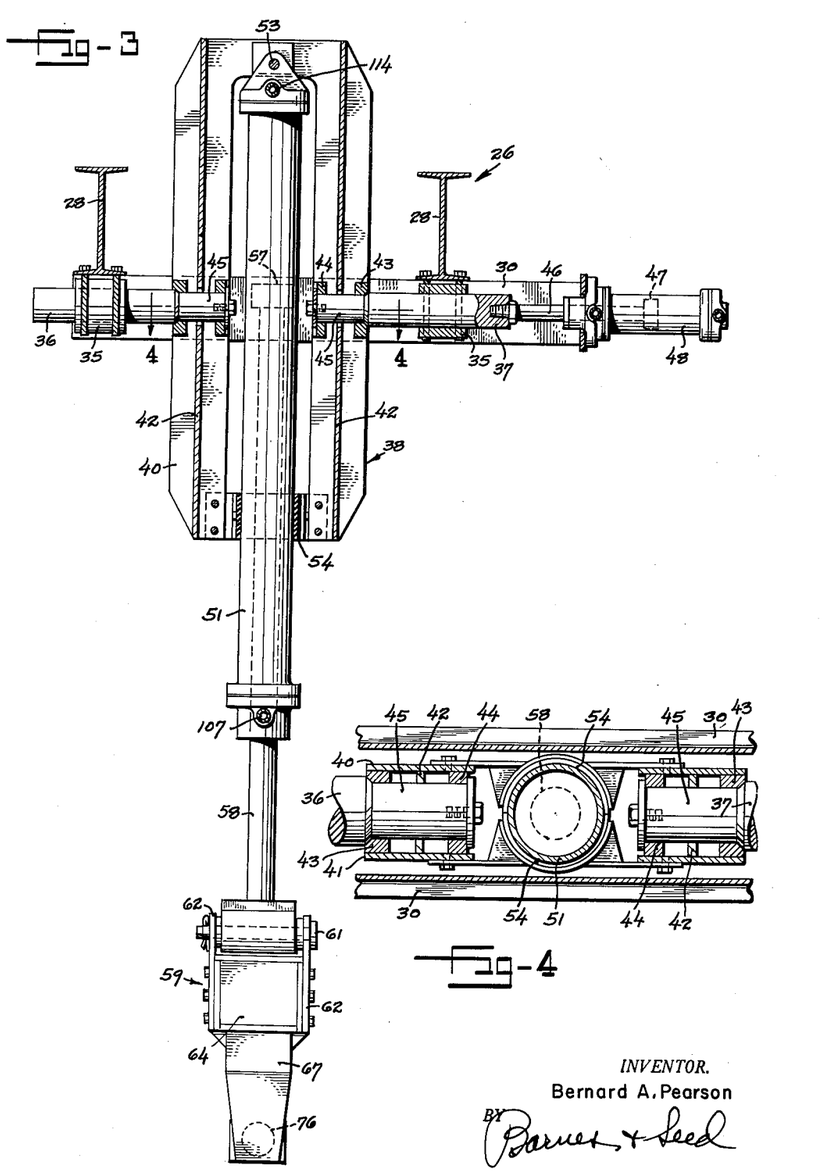
FIG. 3 is a longitudinal vertical sectional view drawn to an enlarged scale on line 3—3 of FIG. 1.
FIG. 4 is a fragmentary horizontal sectional view drawn to a yet larger scale on line 4—4 of FIG. 3.

Reverting to the paired channels 30, and as can be best seen in FIG. 3, a respective bearing is fixed immediately below both the fore and the aft I-beam so as to occupy the opening between each set of channels. Co-axial spaced pivot shafts 36 and 37 are journaled in these bearings. These pivot shafts have their inner ends fixedly secured to the opposite legs of an upstanding yoke 38. There are two such yokes, one at one side and the other at the other side of the carriage, and as can be best seen from an inspection of FIGS. 3 and 4 such yokes are fabricated from spaced apart pieces 40 and 41 of U-shaped plate stock joined by intervening webs 42 and having at the mid-height of each leg, located to the front and to the rear of each web, spanner bars 43 and 44. These spanner bars and the webs are drilled on a coinciding longitudinal horizontal axis, and received through such drill holes and clamped rigidly to the spanner bars are the inner ends 45 of the pivot shafts 36 and 37. A connecting rod 46 is placed co-axial with and is fixedly secured to one of said pivot shafts, and upon the outer end of this rod is a double-acting piston 47 working in an oil cylinder, as 48 and 49. The oil cylinders take their purchase from the paired channels 30, oil under pressure being fed thereto by flexible hoses. These hoses are denoted by 103—104 in the instance of the cylinder 48 and by 105—106 in the instance of the cylinder 49. Such cylinders function to shift the pivot shafts, and hence the yokes, in a horizontal direction endwise to the axis, and will be hereinafter termed the shift cylinders.

The yokes give support to hoisting cylinders, as 51 and 52, engaging the same at the head of the yoke by a pin 53 and at the foot of the yoke by saddles 54, and supplying oil under pressure to the bottom ends of these cylinders are flexible hoses, as 107 and 108. Hoses from the top ends of the cylinders are designated by 114 and 115. These latter hoses perform a drain and vent function. Pistons 57 which work in the cylinders act through connecting rods 58 to raise and lower the opposite ends of a transverse grapple beam 59, the connection from the rods to the beam including wrist pins 61 and boltably anchored straps 62. For a purpose which will be later described, the two hoisting cylinders are toed-in in a moderate degree, and this is to say that the span between the wrist pins 61 is somewhat less than the span between the axes about which the pivot shafts 36—37 at one side and those at the other side rock.

The beam is fabricated from two spaced channel members 60 joined at the center and at each end by cross-plates 64. The two flanges of each channel are exteriorly faced with slippers 63. Grapple blocks 66 and 67 work in the space between the channels and receive a slide journal from the slippers. Each block carries a threaded nut, as 68 and 69, one having a right hand and the other a left hand thread, and functional to these nuts is a screw 70 finding a journal from the cross-plates 64 and powered by a chain 71 driven from a reversing hydraulic motor 72. Three flexible hoses 109, 110 and 117 connect with this motor, the first two supplying oil under pressure and the other being a drain line.

Figure 5:
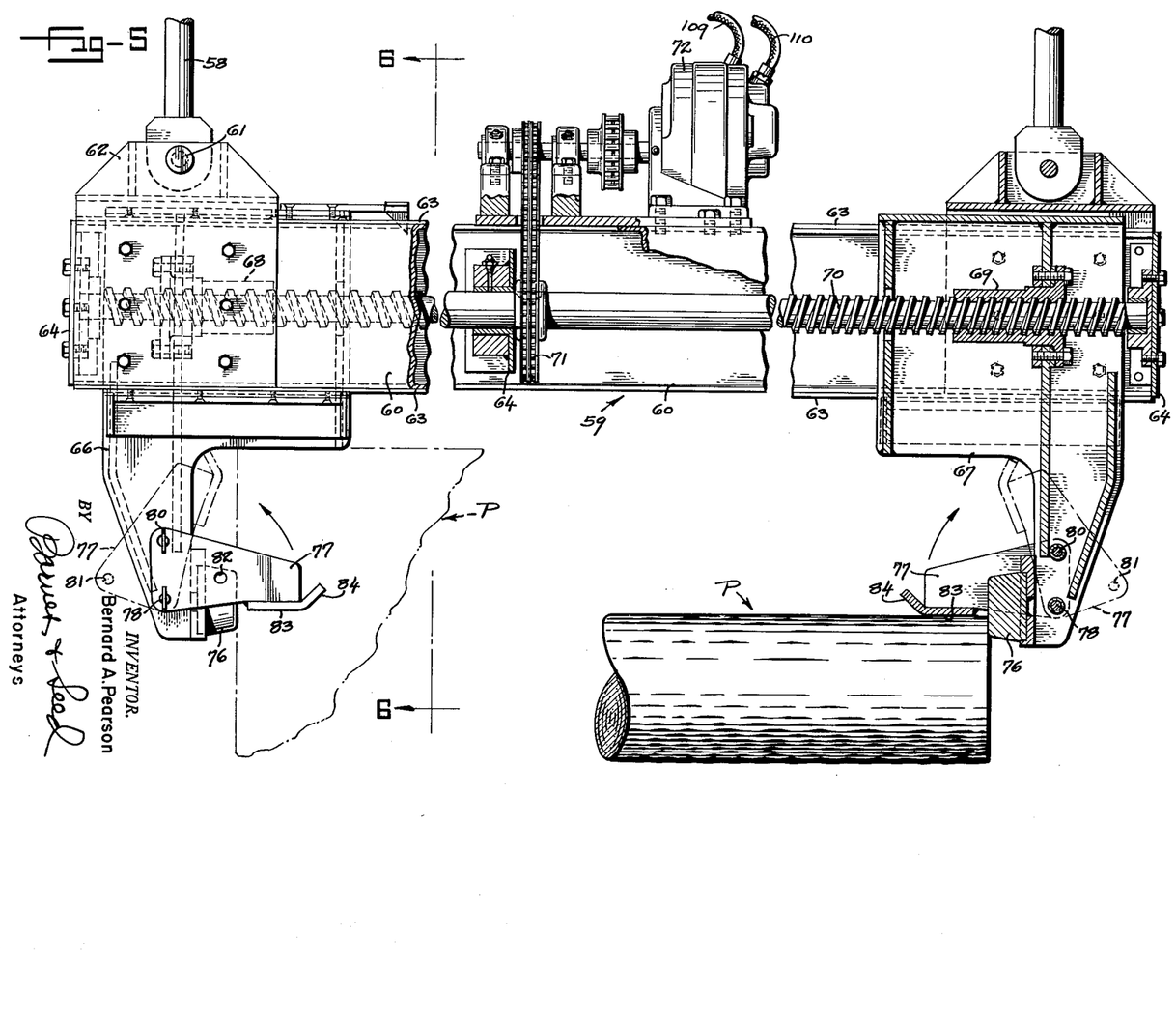
FIG. 5 is a fragmentary transverse vertical sectional view, with parts in elevation, drawn to an enlarged scale on line 5—5 of FIG. 2. The view is compounded in the sense that full and broken lines are employed to indicate the manner in which the opposed clamping jaws of the illustrated grasper beam adapt themselves to peeler blocks of small and large diameter.
Figures 6, 7, 9:
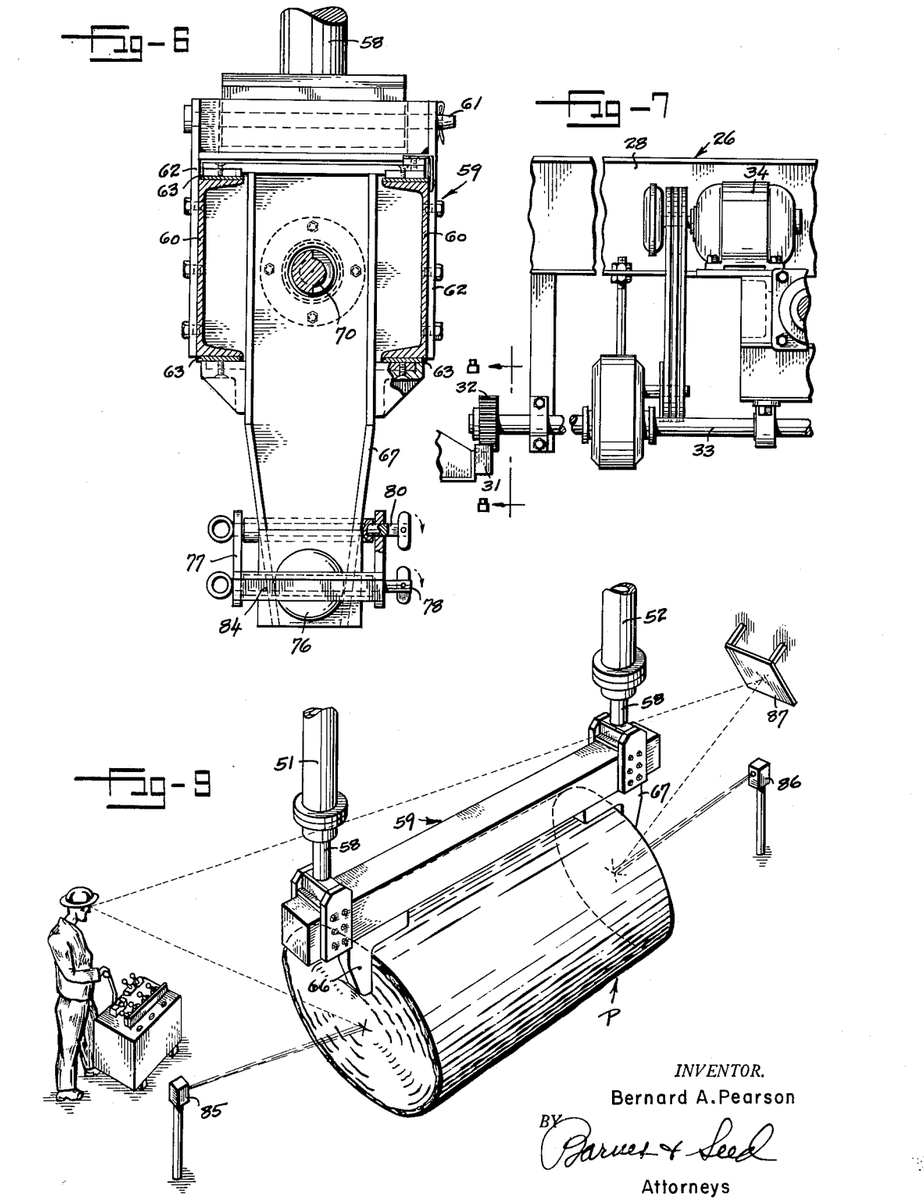
FIG. 6 is a longitudinal vertical sectional view on line 6—6 of FIG. 5.
FIG. 7 is a fragmentary enlarged scale front elevational view detailing structure by which the carriage of the charger is moved horizontally in a longitudinal direction between two extremes of travel, and namely between a pre-centering position and a charging position.
FIG. 9 is a somewhat schematic perspective view illustrating the manner in which projected light rays are employed in "spotting" the peeler blocks as the same are pre-centered by controlled movements imparted to the grasper beam.
Figure 8:
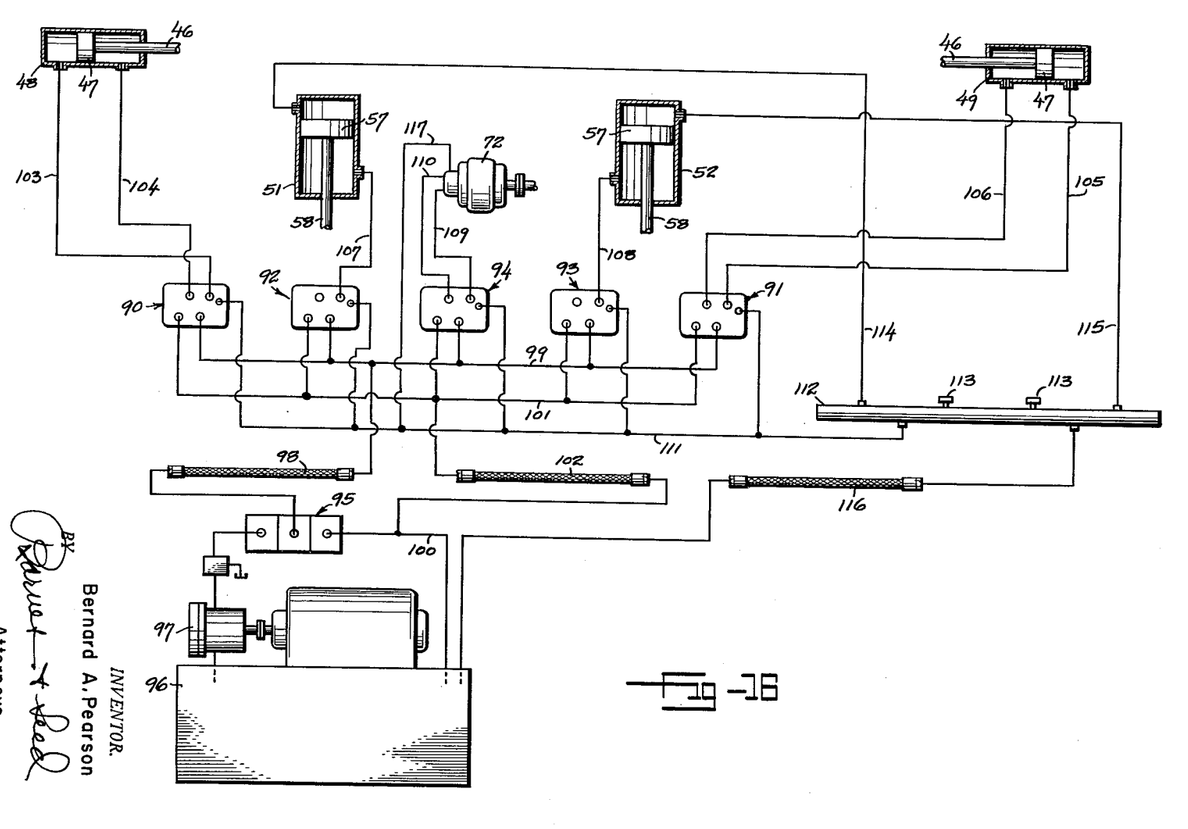
FIG. 8 is a fragmentary longitudinal vertical sectional view on line 8—8 of FIG. 7.
Figure 10:
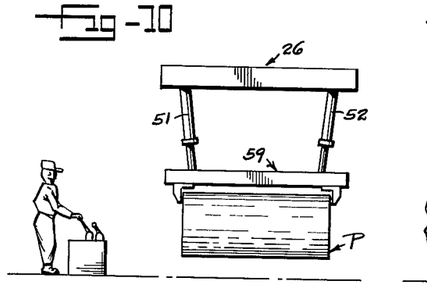
FIGS. 10 through 15 are schematic views illustrating movements to which the grasper beam admits, the illustrations being exaggerated so as better to portray the motions.
Figure 11:
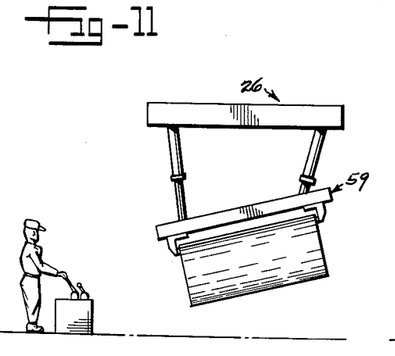
Figure 12:
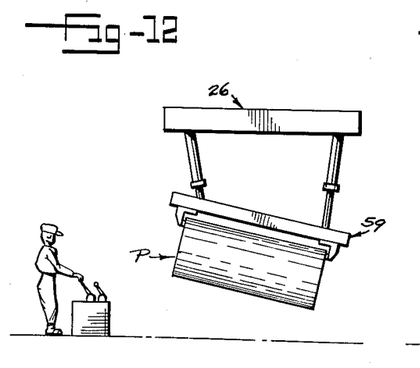
Figure 13:
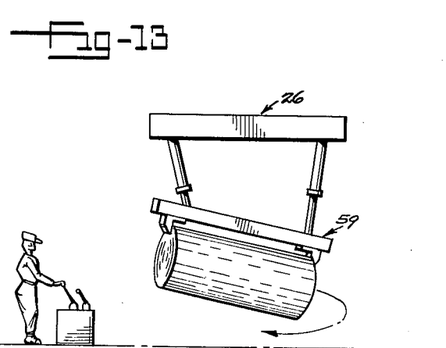
Figure 14:
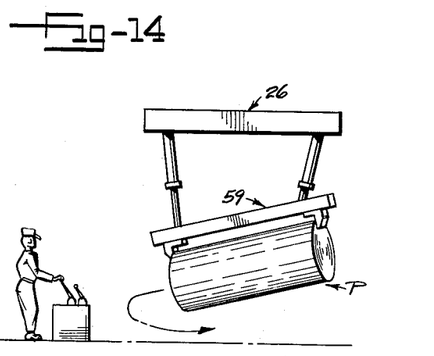
Figure 15:
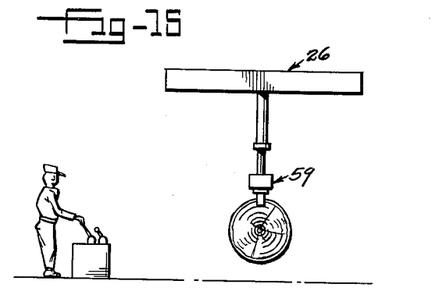

Each grapple block depends by its lower end well below the beam, and upon such lower end carries a respective clamping jaw 76. While the chucking faces of the jaws are here shown as being solid the same are or may be cup chucks. Associated with each of the opposed chucking jaws is a respective log stop 77 adapted to be employed when small-diameter peeler logs are being charged. The function of such stops is to position the chuck so that only the outer edge of the log is engaged, thereby insuring exposure of the center portion of the log for access of the lathe chucks. The stops are each swingable about the center of a pin 78 as an axis from the full-line active to the dotted-line inactive positions shown in FIG. 5, being locked in such positions by a second pin 80 which engages selectively either in a hole 81 or a hole 82 of the stop. The log stops are forked to straddle the depending leg of the grapple block and upon their inner end present a bearing face 83 with an inclined lead-in apron 84 guiding the stop onto the peeler log.

It should be here pointed out that the carriage travels a pre-set distance from its "pick-up" position, whereat the carriage overlies the landing stage, to its "charging" position, whereat the carriage overlies the peeler lathe. At opposite sides of the landing stage, there are provided two opposingly placed lamps 85 and 86 each projecting a light ray along a coinciding axis horizontlaly aligned with and parallel to the center line of the lathe chucks and spaced from the latter a distance exactly corresponding to said pre-set travel of the carriage. It is by recourse to these light rays that logs clamped between the jaws of the charger are brought into positions at which the same will be properly aligned for the lathe chucks. A mirror 87 on the side away from the operator enables him to watch the alignment on the far end of the peeler block.

From the foregoing description it will be seen that the jaws of the charger can be moved inwardly and outwardly to accommodate peeler blocks of differing lengths. It will be also seen that the grapple beam swings endwise in a lateral direction so that, as the jaws close upon a peeler block, the beam centers itself upon the block, later swinging back to normalcy as the grappled block is hoisted off the conveyor. The significance of "toeing in" the hoisting cylinders can be here pointed out, such arrangement placing a stress upon the cylinders and responsively causing the beam to reach a more or less instant state of equilibrium as distinguished from the free-swinging action which would occur were the cylinders to occupy positions parallel to one another.

Considering the further motions to which the beam admits it will be apparent that the two ends can be raised or lowered independently through operation of the hoisting pistons and that such ends may be skewed, or in other words swung horizontally, independently in directions fore and aft of the carriage travel through operation of the shifting pistons, thus permitting controlled movement of the peeler block to a position whereat the projected light beams bear on the exact spots desired for the engagement of the lathe chucks. These spots can be either the "bull's eye" of the block, and namely the center of the age rings, or the approximate radial center of the block, whichever may be desired. While these spots can be pre-marked upon the blocks as guides for the spotting operation it is the more usual custom to depend upon the eye of an experienced operator to bring the peeler block into the position where the light beam will bear upon substantially the exact spot at which the lathe should properly be centered.

Considering the control circuit for the charger it will be seen from an inspection of FIG. 16 that there are five control valves, designated by 90, 91, 92, 93 and 94, and a speed-control unit 95. The speed-control unit is governed by a manually operated control lever. The lever is not shown in FIG. 16 but can be assumed to be the larger of the two visible levers portrayed in the several schematic views 10 through 15. Oil from a supply tank 96 is fed by a pump 97 to the control unit 95 and thence through connection 98 to a pressure line 99, the excess of pumped oil returning through relief line 100 to the tank. The pressure line connects by valved ports with each of the five control valves. Each of the control valves has one valved port thereof connecting with a tank line 101 which feeds by a line 102 into the relief line 100. In each of the two control valves 90 and 91 there are provided valved ports connecting by the hoses 103—104 and 105—106 with the opposite ends of the respective shifting cylinders 48 and 49. In each of the two control valves 92 and 93 there is provided a single valved port connecting by the hoses 107 and 108, respectively, with the lower end of the hoisting cylinders 51 and 52. The remaining control valve 94 has two valved ports connecting by the hoses 109 and 110 with the reversing hydraulic motor 72. From each of the five control valves a drain line 111 leads to a reservoir 112 vented, as at 113, to the atmosphere, and hoses 114 and 115 connect the upper ends of the hoisting cylinders with this drain reservoir. The drain reservoir connects by a hose 116 with the supply tank. It will be understood that the gravity return line 111 is higher than the bottom of the drain reservoir. From the foregoing it will be apparent that the speed at which all of the controlled pistons move is regulated by a single control lever, namely the lever for the unit 95, and that the directional travel of the several pistons is governed by the control valves 90, 91, 92, 93 and 94. These said valves 90, 91, 92, 93 and 94, while manually controlled, are solenoid-operated.

It is though that the invention will have been clearly understood from the foregoing detailed description. Changes will suggest themselves and may be resorted to without departing from the spirit of the invention, wherefore it is my intention that limitations be implied and that the hereto annexed claims be given a scope fully commensurate with the broadest interpretation to which the employed language admits.

What I claim, is:

1. Mechanism for charging log blocks to the axially aligned chucks of a horizontal lathe, and comprising, in combination with the lathe chucks and with a landing for the log blocks, means for gripping a log block on said landing and raising the same to an elevated position, means for shifting the log gripping means so as to move the elevated log block into a pre-centered position whereat a given axis thereof parallels the axial line of the lathe chucks, light rays projected along axially coinciding lines corresponding to said pre-centered position onto the opposite ends of the elevated log block to guide the operator in the pre-centering operation, and means for moving the pre-centered log block bodily from its said pre-centered position to a centered position between the chucks along a plane of travel containing both the axis of the lathe chucks and the pre-centered axis.

2. In mechanism for charging log blocks to the chucks of a horizontal lathe, a landing stage, a crane providing an overhead carriage mounted for movement along a generally horizontal travel path a pre-set distance from a pre-centering position above the landing stage to a charging position overlying the lathe, opposingly mounted jaws suspended from the carriage and adapted to grip the opposite ends of a log block occupying the landing stage, means for elevating and lowering said jaws independently, means for skewing the jaws about a vertical axis in either rotary direction independently, means serving as a guide in the pre-centering of the log block and comprised of lights projecting their rays onto opposite ends of the log block along a coinciding axial line parallelling the rotary axis of the lathe chucks in a plane which traverses the latter and is parallel to the path travelled by the carriage, the spacing between the axial line along which the light rays are projected and the rotary axis of the lathe chucks exactly corresponding to the pre-set distance travelled by the carriage, and means for shifting the carriage between said pre-centering and charging positions.

3. In mechanism for charging log blocks to the chucks of a horizontal lathe, a landing for the log blocks, a crane providing an overhead carriage mounted for movement along a generally horizontal travel path a pre-set distance from a pre-centering position above the landing to a charging position overlying the lathe, a beam hung from the carriage, opposed jaws carried by the beam at the opposite ends thereof for relative movement inwardly and outwardly into and out of gripping engagement with a log block occupying the landing, means for opening and closing said jaws, means for elevating and lowering the opposite ends of the beam independently, means for skewing the ends of the beam independently about a respective vertical axis in either rotary direction, means serving as a guide in the pre-centering of the log block and comprised of lights projecting their rays onto opposite ends of the log block along a coinciding axial line paralleling the rotary axis of the lathe chucks in a plane which traverses the latter and is parallel to the path travelled by the carriage, the spacing between the axial line along which the light rays are projected and the rotary axis of the lathe chucks exactly corresponding to the pre-set distance travelled by the carriage, and means for shifting the carriage between said pre-centering and charging positions.

4. The mechanism of claim 3 in which the means for raising and lowering the ends of the beam, and for skewing the beam ends, are each hydraulically powered.

5. Mechanism according to claim 4 having valves for governing the directional flow of the fluid employed as the hydraulic medium, and having a separate valve common to each of the first-named valves governing the speed at which the hydraulic fluid flows.

6. In mechanism for charging log blocks to the chucks of a horizontal lathe, a landing for the log blocks, a crane providing an overhead carriage mounted for movement along a generally horizontal travel path a pre-set distance from a pre-centering position above the landing to a charging position overlying the lathe, a pair of vertical oil cylinders located one at one side and the other at the other side of the carriage and each pivoted to the carriage so as to swing individually about a respective horizontal axis which generally parallels the travel path of the carriage and also being individually and bodily shiftable relative to the carriage in a direction endwise to said pivot axis, pistons working in said oil cylinders, a beam hung below the pistons with one end supported by a connecting rod attached to one of the pistons and with its other end supported by a connecting rod attached to the other piston, opposed jaws carried by the beam at the opposite ends thereof for relative closing and opening movements into and out of gripping engagement with the opposite ends of a log block occupying the landing, means serving as a guide in the pre-centering of the log block and comprised of lights projecting their rays onto opposite ends of the log block along a coinciding axial line paralleling the rotary axis of the lathe chucks in a plane which traverses the latter and is parallel to the path travelled by the carriage, the spacing between the axial line along which the light rays are projected and the rotary axis of the lathe chucks exactly corresponding to the pre-set distance travelled by the carriage, and manually controlled power means for opening and closing said jaws, for raising and lowering the pistons, for shifting the cylinders, and for moving the carriage.

7. In mechanism for charging log blocks to the chucks of a horizontal lathe, a landing for the log blocks, a crane providing an overhead carriage mounted for movement along a generally horizontal travel path a pre-set distance from a pre-centering position above the landing to a charging position overlying the lathe, a pair of vertical oil cylinders carried by the carriage to occupy positions one at one side and the other at the other side of the carriage and each mounted for horizontal shifting movements in a direction longitudinal to the travel of the carriage, pistons working in said oil cylinders, a beam hung below the pistons with one end supported by a connecting rod attached to one of the pistons and with its other end supported by a connecting rod attached to the other piston, opposed jaws carried by the beam at the opposite ends thereof for relative closing and opening movements into and out of gripping engagement with the opposite ends of a log block occupying the landing, means serving as a guide in the pre-centering of the log block and comprised of lights projecting their rays onto opposite ends of the log block along a coinciding axial line paralleling the rotary axis of the lathe chucks in a plane which traverses the latter and is parallel to the path travelled by the carriage, the spacing between the axial line along which the light rays are projected and the rotary axis of the lathe chucks exactly corresponding to the pre-set distance travelled by the carriage, and manually controlled power means for opening and closing said jaws, for raising and lowering the pistons, for shifting the cylinders, and for moving the carriage.

8. Structure according to claim 7 in which the means for shifting the vertical oil cylinder is comprised of horizontal oil cylinders with pistons working therein and operatively attached by connecting rods to the vertical cylinders.

9. Structure according to claim 7 having a station which is arranged to be occupied by an operator and so located that one end of a gripped log occupying said pre-centering position is visible by the operator, and wherein a mirror is provided so located that said operator can also see the other end of said gripped log from his position at said station.

10. Mechanism for charging log blocks to the axially aligned chucks of a horizontal lathe, and comprising, in combination with the lathe chucks, means occupying a location remote to said lathe chucks for shifting a log block into a pre-centered position whereat a given axis thereof parallels the axial line of the lathe chucks, light rays projected along axially coinciding lines onto the opposite ends of a log block which occupies said remote location and serving to guide the operator in the pre-centering operation, the lines along which said light rays are projected corresponding to said given axis of the pre-centered position and means for moving the pre-centered log block bodily from its said pre-centered position to a position between the chucks along a plane of travel containing both the axis of the lathe chucks and the pre-centered axis.

11. Structure according to claim 10 in which the movement given the log block from its pre-centered position to a position between the chucks is a pre-set distance, and wherein the axial line along which the light rays are projected is spaced from the rotary axis of the lathe chucks a distance exactly corresponding to said pre-set distance travelled by the pre-centered log block in a plane including said rotary axis of the lathe chucks paralleling said plane travelled by the log block.

12. Structure according to claim 10 having a station which is arranged to be occupied by an operator and so located that one end of a gripped log occupying said pre-centering position is visible by the operator, and wherein a mirror is provided so located that said operator can also see the other end of said gripped log from his position at said station.

13. Mechanism for charging log blocks to the axially aligned chucks of a horizontal lathe, and comprising in combination with the lathe chucks, means occcupying a location remote from said lathe chucks for engaging and shifting a log block into a pre-centered position whereat a given axis thereof parallels the axial line of the lathe chucks, two stationary light sources spaced apart a distance greater than the length of a log block to be charged into the lathe and directing beams of light toward each other along a line parallel to the axial line of the lathe chucks, said light beams being projected onto the opposite ends of a log block occupying said remote location and serving to guide the operator in the pre-centering opertion, the line along which said light beams are projected coinciding with said given axis of the log block when in said pre-centered position, and means for moving the pre-centered log block bodily from its said pre-centered position to a position between the lathe chucks in which said given axis of the log block is coincident with the axial line of the lathe chucks.

References Cited in the file of this patent

UNITED STATES PATENTS

| | | |
|---|---|---|
| 1,674,967 | Fitch | June 26, 1928 |
| 1,736,016 | Rosener | Nov. 19, 1929 |
| 2,343,785 | McLaughlin et al. | Mar. 7, 1944 |
| 2,425,750 | McCarty | Aug. 19, 1947 |
| 2,453,947 | Swift | Nov. 16, 1948 |
| 2,523,563 | Foreman | Sept. 26, 1950 |
| 2,546,524 | Schipplock | Mar. 27, 1951 |
| 2,702,570 | Rothrock | Feb. 22, 1955 |
| 2,707,053 | Browning | Apr. 26, 1955 |
| 2,931,403 | Parker | Apr. 5, 1960 |

FOREIGN PATENTS

| | | |
|---|---|---|
| 25,736 | Finland | Feb. 26, 1953 |
| 218,457 | Great Britain | July 10, 1924 |

OTHER REFERENCES

The Timberman, January 1952 issue, advertisement by the Ederer Co.

Bulletin No. V-104, published by the Ederer Co., January 1952.

"Tooling Up By Telescope," pp. 120-123, Fortune, October 1951.